(12) United States Patent
Wang

(10) Patent No.: US 12,500,711 B2
(45) Date of Patent: Dec. 16, 2025

(54) METHOD FOR ALLOCATING CHANNEL, STORAGE SYSTEM, DEVICE, AND MEDIUM

(71) Applicant: SUZHOU METABRAIN INTELLIGENT TECHNOLOGY CO., LTD., Jiangsu (CN)

(72) Inventor: Lupan Wang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/116,962

(22) PCT Filed: Sep. 26, 2023

(86) PCT No.: PCT/CN2023/121769
§ 371 (c)(1),
(2) Date: Mar. 28, 2025

(87) PCT Pub. No.: WO2024/148861
PCT Pub. Date: Jul. 18, 2024

(65) Prior Publication Data
US 2025/0260528 A1    Aug. 14, 2025

(30) Foreign Application Priority Data

Jan. 9, 2023   (CN) .......................... 202310025097.0

(51) Int. Cl.
*H04L 12/43*         (2006.01)
*H04L 5/00*          (2006.01)
*H04L 49/356*        (2022.01)

(52) U.S. Cl.
CPC .......... *H04L 5/0044* (2013.01); *H04L 49/357* (2013.01)

(58) Field of Classification Search
CPC ........................... H04L 5/0044; H04L 49/357
See application file for complete search history.

(56) References Cited

U.S. PATENT DOCUMENTS 8,050,257 B2 * 11/2011 Beshai ............... H04Q 11/0062
                                                 370/401
8,774,200 B2 *  7/2014 Beshai ............... H04Q 11/0005
                                                 370/406

(Continued)

FOREIGN PATENT DOCUMENTS

CA         2565596 A1 * 11/2005
CA         2870192 C  *  8/2016  ............. H04L 41/12

(Continued)

*Primary Examiner* — Thai Dinh Hoang
(74) *Attorney, Agent, or Firm* — IPro, PLLC

(57) ABSTRACT

A method for allocating a channel includes: determining a target data segment to be transmitted in a current time period, and allocating a transmission channel to the target data segment, the transmission channel including an input channel and an output channel, the input channel including a first input channel for inputting from a switch and a second input channel for inputting from a processor, and the output channel including a first output channel for outputting to a storage device and a second output channel for outputting to the processor; and acquiring a quantity of input channels and a quantity of output channels in the current time period, and adjusting the input channel and the output channel based on the quantity of input channels and the quantity of output channels, to make the quantity of input channels equal to the quantity of output channels.

17 Claims, 6 Drawing Sheets

(56) References Cited

U.S. PATENT DOCUMENTS

| | | | | |
|---|---|---|---|---|
| 9,565,487 B2 * | 2/2017 | Beshai | ............... | H04Q 11/0062 |
| 2014/0321853 A1 * | 10/2014 | Beshai | ............... | H04Q 11/0062 |
| | | | | 398/52 |
| 2015/0256410 A1 * | 9/2015 | Beshai | .................... | H04L 49/25 |
| | | | | 370/254 |

FOREIGN PATENT DOCUMENTS

| | | | | | |
|---|---|---|---|---|---|
| CN | 107391403 A | | 11/2017 | | |
| CN | 113986796 A | | 1/2022 | | |
| CN | 115712594 A | * | 2/2023 | | |
| WO | WO-02056526 A2 | * | 7/2002 | ......... | H04L 41/0896 |
| WO | WO-2025003648 A1 | * | 1/2025 | ............... | G06E 3/00 |

* cited by examiner

Determining a target data segment to be transmitted in a current time period, and allocating a transmission channel to the target data segment, the transmission channel including an input channel and an output channel, the input channel including a first input channel for inputting from a switch and a second input channel for inputting from a processor, and the output channel including a first output channel for outputting to a storage device and a second output channel for outputting to the processor ⸺ S101

Acquiring a quantity of input channels and a quantity of output channels in the current time period, and adjusting the input channel and the output channel based on the quantity of input channels and the quantity of output channels, to make the quantity of input channels equal to the quantity of output channels ⸺ S102

FIG. 3

Determining a target data segment to be transmitted in a current time period, and allocating a transmission channel to the target data segment, the transmission channel including an input channel and an output channel, the input channel including a first input channel for inputting from a switch and a second input channel for inputting from a processor, and the output channel including a first output channel for outputting to a storage device and a second output channel for outputting to the processor ⸺ S201

Acquiring a quantity of input channels and a quantity of output channels in the current time period, and adjusting the input channel and the output channel based on the quantity of input channels and the quantity of output channels, to make the quantity of input channels equal to the quantity of output channels ⸺ S202

Adjusting a transmission channel in each stack section in a switching device, to balance the transmission data volume of each stack section ⸺ S203

FIG. 4

METHOD FOR ALLOCATING CHANNEL, STORAGE SYSTEM, DEVICE, AND MEDIUM

CROSS-REFERENCE TO RELATED APPLICATION

This application claims the priority of the Chinese Patent application filed on Monday, Jan. 9, 2023 before the CNIPA, China National Intellectual Property Administration with the application number of 202310025097.0, and the title of "METHOD AND APPARATUS FOR ALLOCATING CHANNEL, STORAGE SYSTEM, DEVICE, AND MEDIUM", which is incorporated herein in its entirety by reference.

FIELD

The present application relates to the field of computer technologies, and more specifically, to a method and apparatus for allocating a channel, a storage system, an electronic device, and a non-transitory readable storage medium.

BACKGROUND

In the era of large data, higher requirements are put forward for the reliability of storage arrays, especially for the high efficiency of data storage in storage systems. A large number of business data increases exponentially, which brings pressure to the data transmission of storage devices. A current data transmission link has been upgraded to Peripheral Component Interconnect Express (PCIe) 5.0. The data transmission efficiency is affected by the work exchange efficiency of a PCIe switch (a PCIe switching device) in the transmission process. However, the conventional data transmission through the PCIe switch does not take an internal structure into account, a channel is allocated only according to an external pin of a switch chip. Furthermore, an operation, such as dynamic channel allocation is not considered in the working process, directly leading to the low data transmission and switching rate of the PCIe switch.

SUMMARY

An objective of the present application is to provide a method and apparatus for allocating a channel, a storage system, an electronic device, and a non-transitory readable storage medium, to ensure that a switching device can work in an optimal data transmission state in each time period by adjusting a transmission channel of the switching device, thereby improving storage efficiency.

In order to achieve the foregoing objective, the present application provides a method for allocating a channel, which is applied to a switching device and includes:
  determining a target data segment to be transmitted in a current time period, and allocating a transmission channel to the target data segment, the transmission channel including an input channel and an output channel, the input channel including a first input channel for inputting from a switch and a second input channel for inputting from a processor, and the output channel including a first output channel for outputting to a storage device and a second output channel for outputting to the processor; and
  acquiring a quantity of input channels and a quantity of output channels in the current time period, and adjusting the input channel and the output channel based on the quantity of input channels and the quantity of output channels, to make the quantity of input channels equal to the quantity of output channels.

Optionally, before the determining a target data segment to be transmitted in a current time period, the method further includes:
  partitioning data to be transmitted into a plurality of data segment, each data segment corresponding to one time period.

Optionally, after the partitioning data to be transmitted into a plurality of data segments, the method further includes:
  marking a start bit and an end bit of each data segment.

Optionally, the determining a target data segment to be transmitted in a current time period, and allocating a transmission channel to the target data segment includes:
  determining the target data segment to be transmitted in the current time period; and
  when the start bit of the target data segment is detected, allocating the transmission channel to the target data segment.

Optionally, the adjusting the input channel and the output channel based on the quantity of input channels and the quantity of output channels includes:
  if the quantity of input channels is less than the quantity of output channels, adjusting the input channel and the output channel according to a data processing state of the processor.

Optionally, the adjusting the input channel and the output channel according to a data processing state of the processor includes:
  if the processor is in a busy state, reducing the quantity of second output channels.

Optionally, the adjusting the input channel and the output channel according to a data processing state of the processor includes:
  if the processor is in an idle state, increasing the quantity of second output channels.

Optionally, after the increasing the quantity of second output channels, the method further includes:
  increasing the quantity of first input channels.

Optionally, the adjusting the input channel and the output channel based on the quantity of input channels and the quantity of output channels includes:
  if the quantity of input channels is greater than the quantity of output channels, increasing the quantity of first output channels.

Optionally, after the increasing the quantity of first output channels, the method further includes:
  creating a first independent region in the remaining storage resources of the storage device, and mapping the added first output channel into the first independent region; and
  after the target data segment corresponding to the current time period is transmitted, integrating data in the first independent region into total storage resources.

Optionally, after the adjusting the input channel and the output channel based on the quantity of input channels and the quantity of output channels, the method further includes:
  adjusting a transmission channel in each stack section in the switching device, to balance the transmission data volume of each stack section.

Optionally, the adjusting a transmission channel in each stack section in the switching device includes:
  calculating an average value of input channels and an average value of output channels in each stack section in the switching device; and adjusting the input channels in each stack section based on the average value of the input channels, and adjusting the output channels in each stack section based on the average value of the output channels.

Optionally, the adjusting a transmission channel in each stack section in the switching device includes:

acquiring a quantity of idle channels in each stack section in the switching device;

if the quantity of idle channels is greater than a pre-set value, reducing a transmission channel in a corresponding stack section; and if the quantity of idle channels is less than the pre-set value, adding a transmission channel in a corresponding stack section.

Optionally, after the adjusting a transmission channel in each stack section in the switching device, the method further includes:

creating a second independent region in the remaining storage resources of the storage device, and mapping the adjusted transmission channel in each stack section into the second independent region; and after the target data segment corresponding to the current time period is transmitted, integrating data in the second independent region into the total storage resources.

Optionally, an embodiment of this application further discloses an apparatus for allocating a channel, applied to a switching device and including:

an allocation module, configured to determine a target data segment to be transmitted in a current time period, and allocate a transmission channel to the target data segment, the transmission channel comprising an input channel and an output channel, the input channel comprising a first input channel for inputting from a switch and a second input channel for inputting from a processor, and the output channel comprising a first output channel for outputting to a storage device and a second output channel for outputting to the processor; and a first adjustment module, configured to acquire a quantity of input channels and a quantity of output channels in the current time period, and adjust the input channel and the output channel based on the quantity of input channels and the quantity of output channels, to make the quantity of input channels equal to the quantity of output channels.

An embodiment of this application further discloses an electronic device, including a memory, configured to store a computer program; and a processor, configured to execute the computer program to implement the steps of the method for allocating a channel according to the first aspect.

An embodiment of this application further discloses a non-transitory readable storage medium, having a computer program store therein, wherein a processor executes the computer program to implement the steps of the method for allocating a channel according to the first aspect.

Optionally, an embodiment of this application further discloses a storage system, including a server, a switch, a switching device, a processor, and a storage device, the server is connected to a first target stack section of the switching device via the switch, input channels of the first target stack section are all connected to the switch, one part of output channels of the first target stack section are connected to the switch, and the other part of the output channels of the first target stack section are connected to the storage device;

the storage device is connected to a second target stack section of the switching device, output channels of the second target stack section are all connected to the storage device, one part of input channels of the second target stack section are connected to the storage device, and the other part of the input channels of the second target stack section are connected to the switch;

the server is configured to transmit data to the switching device via the switch;

the switching device is configured to transmit the data to the processor;

the processor is configured to process the data, and return the processed data to the switching device;

the switching device is further configured to transmit the processed data to the storage device for storage; and the processor is further configured to determine a target data segment to be transmitted in a current time period, allocate an input channel and an output channel to the target data segment, and adjust the input channel and the output channel based on a quantity of input channels and a quantity of output channels in the current time period, to make the quantity of input channels equal to the quantity of output channels.

Optionally, the total quantity of input channels and the total quantity of output channels in each stack section in the switching device are equal.

Optionally, a quantity of input channels and a quantity of output channels of the processor are equal.

It can be seen from the foregoing solution that the method for allocating a channel provided in the present application includes: determining the target data segment to be transmitted in the current time period, and allocating the transmission channel to the target data segment, the transmission channel including the input channel and the output channel, the input channel including the first input channel for inputting from the switch and the second input channel for inputting from the processor, and the output channel including the first output channel for outputting to the storage device and the second output channel for outputting to the processor; and acquiring the quantity of input channels and the quantity of output channels in the current time period, and adjusting the input channel and the output channel based on the quantity of input channels and the quantity of output channels, to make the quantity of input channels equal to the quantity of output channels.

According to the method for allocating a channel provided in the present application, the quantities of input and output channels are adjusted according to a data transmission condition in the current time period, to ensure that the quantities of input and output channels are as equal as possible after adjustment. In this way, the maximum switch transmission rate can be ensured. It can be seen from the above that in the present application, by adjusting the transmission channel of the switching device, it is ensured that the switching device can work in an optimal data transmission state in each time period, thereby improving the storage efficiency.

The present application further discloses an apparatus for allocating a channel, an electronic device, and a non-transitory readable storage medium, which can also achieve the foregoing technical effects.

It should be understood that both the foregoing general description and the following detailed description are exemplary only and are not intended to limit the present application.

BRIEF DESCRIPTION OF THE DRAWINGS

In order to describe technical solutions of the embodiments of the present disclosure more clearly, the accompanying drawings used in the illustration of the embodiments will be briefly introduced. Apparently, the accompanying drawings in the following explanation illustrate merely some embodiments of the present disclosure, and those skilled in the art may obtain other accompanying drawings based on these accompanying drawings without paying any creative effort.

FIG. 3 is a flowchart of a method for allocating a channel according to an example embodiment;

FIG. 4 is a flowchart of another method for allocating a channel according to an example embodiment;

DETAILED DESCRIPTION

A clear and thorough description for technical solutions in the embodiments of the present disclosure will be given below in conjunction with the accompanying drawings in the embodiments of the present disclosure. Apparently, the described embodiments are a part of embodiments of the present disclosure, not all the embodiments. All other embodiments obtained, based on the embodiments in the present disclosure, by those skilled in the art without paying creative effort fall within the protection scope of the present disclosure.

Figure 1:
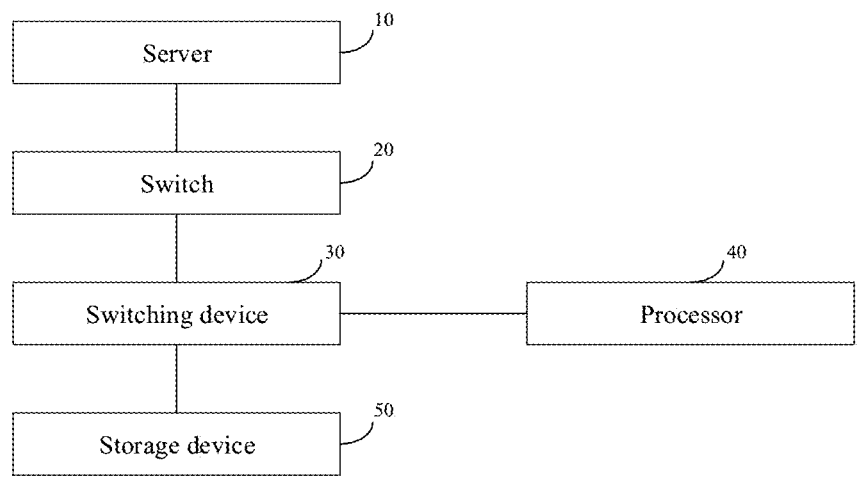
FIG. 1 is a structural diagram of a storage system according to an example embodiment.

This embodiment provides a storage system. FIG. 1 is a structural diagram of a storage system according to an exemplary embodiment. As shown in FIG. 1, the storage system includes a server 10, a switch 20, a switching device 30, a processor 40, and a storage device 50.

The server 10 is connected to a first target stack section of the switching device 30 via the switch 20, input channels of the first target stack section are all connected to the switch 20, one part of output channels of the first target stack section are connected to the switch 20, and the other part of the output channels of the first target stack section are connected to the storage device 50.

The storage device 50 is connected to a second target stack section of the switching device 30, output channels of the second target stack section are all connected to the storage device 50, one part of input channels of the second target stack section are connected to the storage device 50, and the other part of the input channels of the second target stack section are connected to the switch 20.

The server 10 is configured to transmit data to the switching device 30 via the switch 20.

The switching device 30 is configured to transmit the data to the processor 40.

The processor 40 is configured to process the data, and return the processed data to the switching device 30.

The switching device 30 is further configured to transmit the processed data to the storage device 50 for storage.

The processor 40 is further configured to determine a target data segment to be transmitted in a current time period, allocate an input channel and an output channel to the target data segment, adjust the input channel and the output channel based on a quantity of input channels and a quantity of output channels in the current time period, to make the quantity of input channels equal to the quantity of output channels.

In this embodiment, a topology structure at the hardware level is a cascade structure of "server+switch+storage". The switching device in this embodiment may be specifically a Peripheral Component Interconnect Express (PCIe) switch. Units connected to the switching device includes three parts. A first part is that the PCIe switch on a storage main board is connected to the switch via optical fibre transmission of a Fibre Channel host bus adapter (Fibre Channel HBA), data processed at the server end is transmitted to back-end storage via the switch; and a PCIe switch chip is mainly configured to read data transmitted via the switch. A second part is that the PCIe switch is connected to a central processing unit (CPU) via a PCIe channel, the PCIe transmission channel is mainly configured for bidirectional connection, the PCIe switch writes front-end data into the CPU, and the CPU performs a series of data processing operations and transmits the processed data to the PCIe switch for flushing to disk. A third part is that the PCIe switch is connected to a back-end storage device via the PCIe channel, the storage device may be specifically a Non-Volatile Memory Expression (NVMe, also referred to as Non-Volatile Memory Host Controller Interface Specification) type solid-state drive (SSD), the PCIe switch writes the processed data into the back-end SSD, and at this moment, the PCIe switch is mainly configured to write data.

According to the foregoing analysis, the data transmission between the PCIe switch and the switch is mainly data reading, and the data transmission between the PCIe switch and the SSD is mainly data writing. Therefore, in this embodiment, a channel on the PCIe switch chip is allocated on a physical layer as needed. In the conventional PCIe switch allocation, for each stack in the chip, the symmetry of the input channel and the output channel is maintained. It is assumed that there are 8 x2 PCIe channels for inputting from the switch to one stack of the PCIe switch, additional 8 x2 PCIe channels are connected from the stack to the switch, and the channels are allocated to each stack in the chip in such a way to ensure the physical layer transmission balance.

Considering the internal stack structure of the PCIe switch chip and the working characteristics of the cascade structure that the front end reads data and the back end writes data, data inputted in each stack in the chip is exchangeable with each other, and processed data from one stack may be outputted from any stack. Therefore, during channel allocation, it is assumed that data in the switch is written into the first target stack section, the input channels in the first target stack section are all connected to the switch, while only a x2 or x4 channel selected from the output channels in the first target stack section is connected to the switch. Because the PCIe switch mainly reads data in most working states, the remaining channels in the first target stack section are reserved for the storage device and are connected to the storage device. Because the storage device mainly reads data from the PCIe switch, and likewise, in the remaining stacks, the second target stack section that is connected to the storage device and is mainly configured to write data is allocated in this way. The output channels in the second target stack section are all cascaded with the storage device, only a x2 or x4 channel selected from the input channels is cascaded with the SSD, and the remaining input channels are reserved for the switch end.

As a preferred implementation, the total quantity of input channels and the total quantity of output channels in each stack section in the switching device are equal. In a specific implementation, the whole balance of input and output channels in each stack is maintained. For example, when a x2 channel is selected as a write channel for the switch, a x2 channel is selected from another stack as a read channel for the storage device.

As a preferred implementation, the quantity of input channels and the quantity of output channels of the processor are equal. In a specific implementation, a concatenation between the switching device and the processor is a symmetric concatenation, so that write and read data is relatively balanced.

Figure 2:
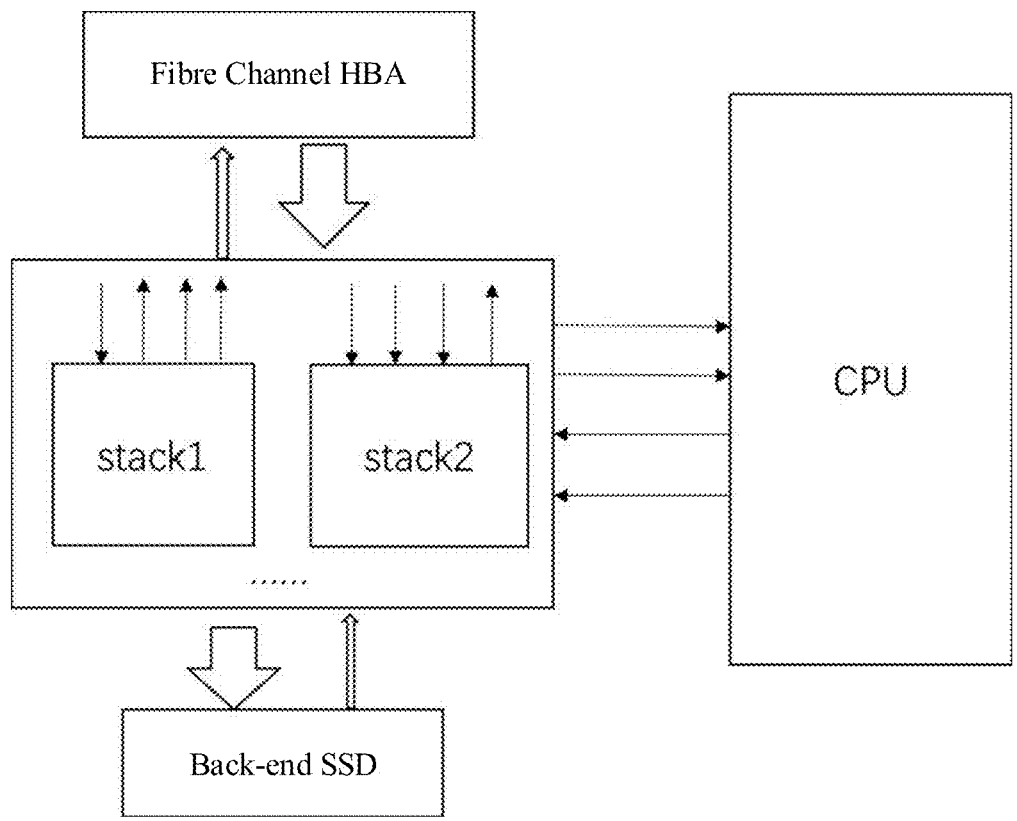
FIG. 2 is a schematic diagram of channel allocation of a Peripheral Component Interconnect Express (PCIe) switch according to an exemplary embodiment.

For example, FIG. 2 is a schematic diagram of channel allocation of a PCIe switch according to an exemplary embodiment, data in a switch is written into STACK2, and thus all input channels in STACK2 are connected to the switch, while only a x2 or x4 channel selected from output channels in STACK2 is connected to the switch. Because a PCIe switch mainly reads data in most working states. The remaining channels in STACK2 are reserved for an SSD unit and are connected to the SSD unit. Because the SSD mainly reads data from the PCIe switch, and likewise, in the remaining stacks, a stack that is connected to the SSD and is mainly configured to write data is allocated in this way, output channels in the stack are all cascaded with the SSD, a x2 or x4 channel selected from input channels is cascaded with the SSD, and the remaining input channels are reserved for the switch end. It should be noted that in the design process, the whole balance of input and output channels in each stack is maintained. When a x2 channel is selected as a write channel for the switch, a x2 channel is selected from STACK1 as a read channel for the SSD. In addition, a concatenation between the PCIe switch and a CPU is a symmetric concatenation, so that write and read data is relatively balanced.

It can be seen from the above that this embodiment provides an implementation method for allocating PCIe channels at the hardware level. According to a data transmission condition and characteristics of the internal stack structure, the data channels on the PCIe switch are reallocated, to ensure the whole balance of input and output channels in the stack after allocation. In this way, the PCIe SWITCH can exert the data transmission capability in storage to the greatest extent.

The embodiments of the present application disclose a method for allocating a channel, to ensure that a switching device can work in an optimal data transmission state in each time period by adjusting a transmission channel of the switching device, thereby improving storage efficiency.

FIG. 3 is a flowchart of a method for allocating a channel according to an exemplary embodiment. As shown in FIG. 3, the method includes:

S101: Determining a target data segment to be transmitted in a current time period, and allocating a transmission channel to the target data segment, the transmission channel including an input channel and an output channel, the input channel including a first input channel for inputting from a switch and a second input channel for inputting from a processor, and the output channel including a first output channel for outputting to a storage device and a second output channel for outputting to the processor.

As a possible implementation, before the determining target transmission data to be transmitted in a current time period is determined, the method further includes: partitioning data to be transmitted into a plurality of data segments, each data segment corresponding to one time period. In a specific implementation, a time period and a transmission resource in the current time period are first determined, and the data is partitioned into n segments according to data transmission requirements, and the n segments correspond to n different time periods.

Further, a start bit and an end bit of each data segment are marked. The target data segment to be transmitted in the current time period is determined. When the start bit of the target data segment is detected, the transmission channel is allocated to the target data segment.

In a specific implementation, when detecting the start bit of the data, a PCIe switch records the start of data transmission. In the transmission process, the channel is preliminarily allocated, and the PCIe switch will automatically allocate the channel to complete data transmission according to a data transmission condition in this time period. The allocated transmission channel includes the input channel and the output channel, the input channel includes the first input channel for inputting from the switch to the switching device and the second input channel for inputting from the processor to the switching device, and the output channel includes the first output channel for outputting from the switching device to the storage device and the second output channel for outputting from the switching device to the processor.

S102: Acquiring a quantity of input channels and a quantity of output channels in the current time period, and adjusting the input channel and the output channel based on the quantity of input channels and the quantity of output channels, to make the quantity of input channels equal to the quantity of output channels.

In a specific implementation, after preliminary allocation is completed, information about the input/output channels in the allocation process and information about data transmission states between each channel and a CPU and an SSD are integrated into a large-scale system carried by the CPU unit. After receiving the current data transmission states and the transmission channel condition, the CPU preferentially makes a judgment and formulates a corresponding adjustment strategy according to the condition, with an optimization goal of making the quantities of channels for inputting and outputting data equal.

As a possible implementation, the adjusting the input channel and the output channel based on the quantity of input channels and the quantity of output channels includes: if the quantity of input channels is less than the quantity of output channels, adjusting the input channel and the output channel according to a data processing state of the processor. In a specific implementation, when it is monitored that the quantity of channels for currently writing data into the PCIe switch is less than the quantity of output channels, a data processing condition in the CPU at this moment is preferentially analyzed.

If the processor is in a busy state, the quantity of second output channels is reduced. In a specific implementation, if the data processing state of the CPU is the busy state, the quantity of channels for writing data from the PCIe switch into the CPU is reduced. In this way, the balance of the data processing channels of the PCIe switch is maintained, and it is ensured that the CPU does not run in an overload state.

If the processor is in an idle state, the quantity of second output channels is increased. In a specific implementation, if the data processing state of the CPU is the idle state, the data processing channels of the CPU are adjusted, and meanwhile, the data channels between the PCIe switch and the switch are increased, that is, the quantity of first input channels is increased.

As a possible implementation, the adjusting the input channel and the output channel based on the quantity of input channels and the quantity of output channels includes: if the quantity of input channels is greater than the quantity of output channels, increasing the quantity of first output channels. Preferably, after the increasing the quantity of first output channels, the method further includes: creating a first independent region in the remaining storage resources of the storage device, and mapping the added first output channel into the first independent region; and after the target data segment corresponding to the current time period is transmitted, integrating data in the first independent region into total storage resources.

In a specific implementation, when it is monitored that the quantity of channels for currently writing data into the PCIe switch is greater than that of output channels, a data storage state of the back-end SSD is preferentially analyzed, an independent region is proposed from the remaining storage resources of the storage device, a corresponding data transmission channel is added and the newly added transmission channel is mapped into the independent region, and after data transmission in this time period is completed, the newly added storage region is integrated into the total storage resources.

According to the method for allocating a channel provided in the embodiments of the present application, the quantities of input and output channels are adjusted according to the data transmission condition in the current time period, to ensure that the quantities of input and output channels are as equal as possible after adjustment. In this way, the maximum switch transmission rate can be ensured. As demonstrated above, in the embodiments of the present application, by adjusting the transmission channel of the switching device, it is ensured that the switching device can work in an optimal data transmission state in each time period, thereby improving the storage efficiency.

The embodiments of the present application disclose a method for allocating a channel. Compared with the foregoing embodiment, in this embodiment, the technical solution is further described and optimized specifically as follows.

FIG. 4 is a flowchart of another method for allocating a channel according to an exemplary embodiment. As shown in FIG. 4, the method includes:

S201: Determining a target data segment to be transmitted in a current time period, and allocating a transmission channel to the target data segment, the transmission channel including an input channel and an output channel, the input channel including a first input channel for inputting from a switch and a second input channel for inputting from a processor, and the output channel including a first output channel for outputting to a storage device and a second output channel for outputting to the processor;

S202: Acquiring a quantity of input channels and a quantity of output channels in the current time period, and adjusting the input channel and the output channel based on the quantity of input channels and the quantity of output channels, to make the quantity of input channels equal to the quantity of output channels; and S203: Adjusting a transmission channel in each stack section in a switching device, to balance the transmission data volume of each stack section.

In a specific implementation, a condition of an internal stack is optimized after input and output capabilities of a PCIe switch have reached a balance at this moment, with an optimization goal of balancing working capabilities of the stack sections in the PCIe switch, thereby ensuring that the PCIe switch can exert the maximum work efficiency.

As a possible implementation, the adjusting a transmission channel in each stack section in a switching device includes: calculating an average value of input channels and an average value of output channels in each stack section in the switching device; and the input channels in each stack section are adjusted based on the average value of the input channels, and the output channels in each stack section are adjusted based on the average value of the output channels.

In a specific implementation, the PCIe switch first counts working conditions of the input and output channels in each stack section at this moment, and transmits quantified working conditions to the processor as input parameters for optimization. For example, if STACK1 includes a total of n channels, m channels are used for inputting data and j channels are used for outputting data at this moment, and k channels are idle at this moment. According to the conditions of the channels in each stack in the input parameters, the processor first calculates a total quantity of input channels and a total quantity of output channels that are currently participating in the work, and respectively calculates average values of the current input/output channels according to the quantity of stacks to obtain a preliminary channel adjustment result. Each stack is adjusted according to the preliminary channel adjustment result.

As a preferred implementation, the adjusting a transmission channel in each stack section in a switching device includes: acquiring a quantity of idle channels in each stack section in the switching device; if the quantity of idle channels is greater than a pre-set value, reducing a transmission channel in a corresponding stack section; and if the quantity of idle channels is less than the pre-set value, adding a transmission channel in a corresponding stack section.

In a specific implementation, considering an actual working condition of each stack section at this moment, a channel adjustment result of each stack is given. Each stack in this time period is sorted according to a k value of the idle channel, and on the basis of the preliminary adjustment result, 1 or 2 channels are less allocated to the stack with more idle channels, and 1 or 2 channels are more allocated to the stack with fewer idle channels, thereby finally maintaining dynamic balance.

Further, after the adjusting a transmission channel in each stack section in a switching device, the method further includes: creating a second independent region in the remaining storage resources of the storage device, and mapping the adjusted transmission channel in each stack section into the second independent region; and after the target data segment corresponding to the current time period is transmitted, integrating data in the second independent region into total storage resource.

In a specific implementation, the second independent region is created in the storage device, conditions of the adjusted input/output channels are mapped into the created second independent region according to the given channel adjustment result, and data in the storage space is integrated into the total storage space at the end of this time period.

It can be seen from the above that this embodiment provides a method for adjusting the transmission channels of the upper and lower layers. An optimization goal of upper-layer optimization is to make the quantities of channels used for inputting and outputting data in the transmission process equal. On the basis of preliminary allocation, the channel is adjusted according to a working state of the processor and a resource occupation condition of the back-end storage device, to finally ensure that the data input and output volumes of the PCIe switch are equal in the current time period. In this way, the PCIe switch can exert the maximum performance. An optimization goal of lower-layer optimization is to balance the working capabilities of the stack sections in the PCIe switch. On the basis of the upper-layer optimization, the channel in the stack is adjusted twice. The first time is to adjust the quantity of channels to ensure the balance between the input and output channels in each stack, and the second time is to adjust the channel according to the current working state of the stack to ensure that the PCIe switch can exert the maximum work efficiency.

Figure 5:
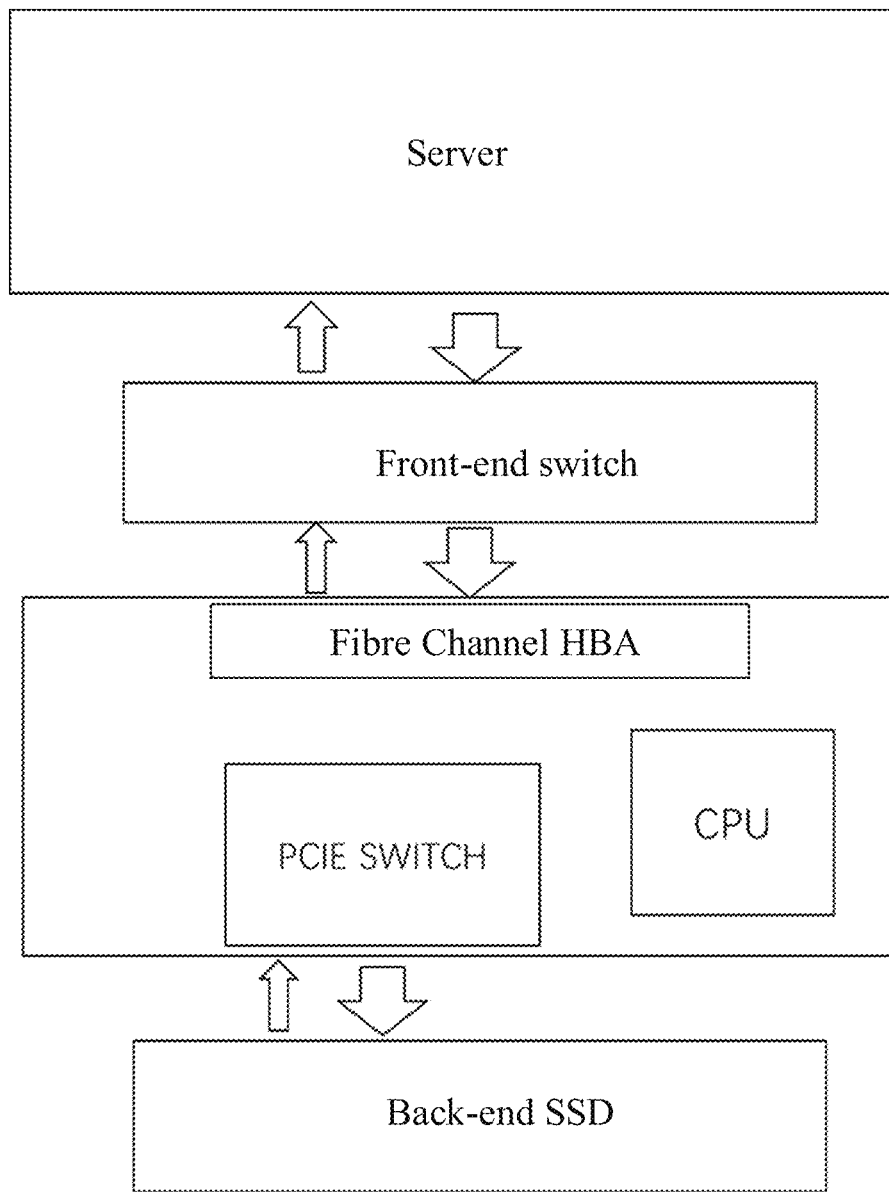
FIG. 5 is a structural diagram of another storage system according to an example embodiment.

In the following, an application embodiment provided by the present application is described. A topology structure at the hardware level is a cascade structure of "server+switch+storage", and is specifically shown in FIG. 5. Units connected to a PCIe switch chip in the figure includes three parts. A first part is that a PCIe switch on a storage main board is connected to a switch via optical fibre transmission of a Fibre Channel HBA, data processed at a server end is transmitted to back-end storage via the switch, and the PCIe switch chip is mainly configured to read data transmitted via the switch. A second part is that the PCIe switch is connected to a CPU via a PCIe channel, the PCIe transmission channel is mainly configured for bidirectional connection, the PCIe switch writes front-end data into the CPU, and the CPU performs a series of data processing operations and transmits the processed data to the PCIe switch for flushing to disk. A third part is that the PCIe switch is connected to a back-end NVMe-type SSD via the PCIe channel and writes the processed data into the back-end SSD, and at this moment, the PCIe switch is mainly configured to write data.

Figure 6:
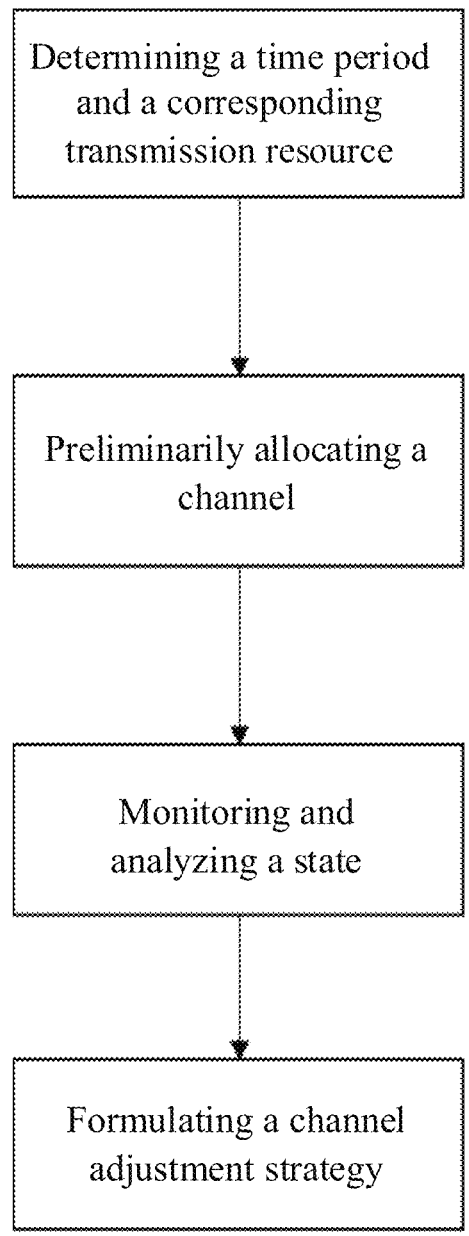
FIG. 6 is a flowchart of upper-layer optimization according to an exemplary embodiment.

A dynamic storage path planning algorithm at the software level includes upper and lower layers. An upper-layer optimization goal is to make the quantities of channels used for inputting and outputting data in the transmission process equal, and on the basis of the upper optimization, a lower-layer optimization goal is to balance the data transmission volume of each stack. An upper-layer optimization flow is shown in FIG. 6. Firstly, a time period and a transmission resource in the current time period are determined. Data is partitioned into n segments according to data transmission requirements, and the n segments correspond to n different time periods. Start and end bits of each data segment to be transmitted are marked in advance in the system. When detecting the start bit of the data, the PCIe switch records the start of data transmission. In the transmission process, a channel is preliminarily allocated, and the PCIe SWITCH will automatically allocate the channel to complete data transmission according to a data transmission condition in this time period. After preliminarily allocation is completed, information about input/output channels in the allocation process and information about data transmission states between each channel and a CPU and between each channel and an SSD are integrated into a large-scale system carried by the CPU unit. After receiving the current data transmission states and the transmission channel condition, the CPU preferentially makes a judgment and formulates a corresponding adjustment strategy according to the condition. When it is monitored that the quantity of channels for currently writing data into the PCIe switch is less than the quantity of output channels, a data processing condition in the CPU at this moment is preferentially analyzed. If a data processing state of the CPU is a busy state, the quantity of channels for writing data from the PCIe switch into the CPU is reduced. In this way, the balance of the data processing channels of the PCIe switch is maintained, and it is ensured that the CPU does not run in an overload state. If the data processing state of the CPU processing data is an idle state, the data processing channels of the CPU are adjusted, and meanwhile, the data channels between the PCIe switch and the switch are increased. When it is monitored that the quantity of channels for currently writing data into the PCIe switch is greater than that of output channels, a data storage state of the back-end SSD is preferentially analyzed, an independent region is proposed from the remaining storage resources of the SSD, a corresponding data transmission channel is added and the newly added transmission channel is mapped into the independent region, and after data transmission in this time period is completed, the newly added storage region is integrated into the total storage resources.

Figure 7:
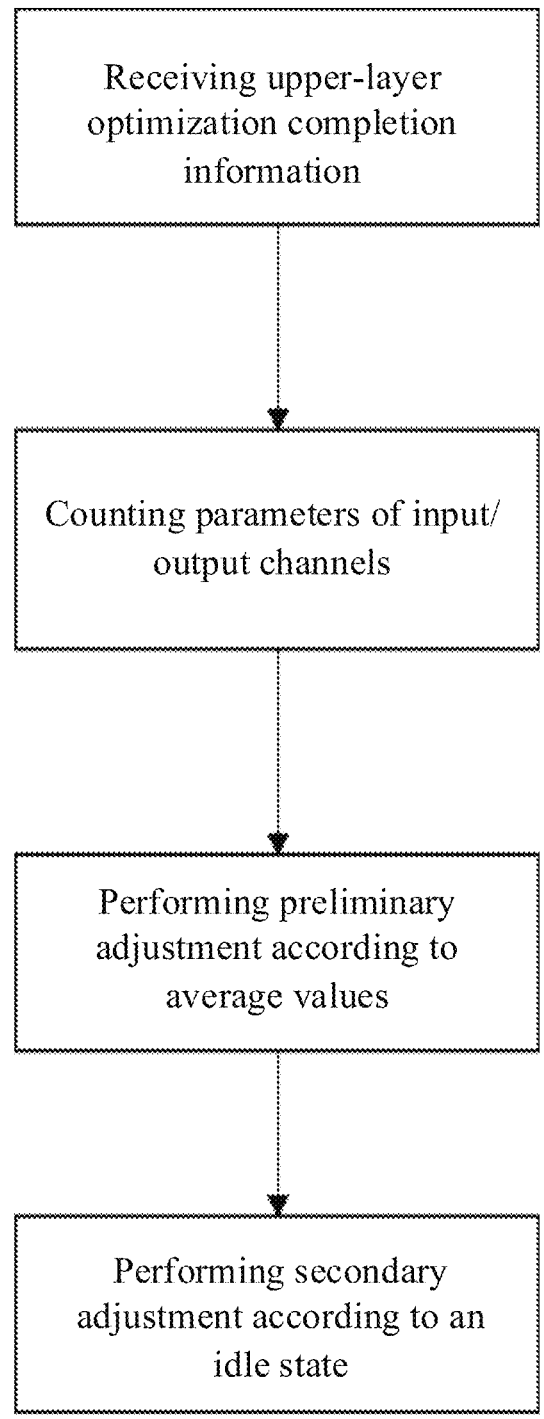
FIG. 7 is a flowchart of lower-layer optimization according to an exemplary embodiment.

A lower-layer optimization flow is shown in FIG. 7. An optimization goal is to balance working capabilities of stack sections in a PCIe switch, to ensure that the PCIe switch can exert the maximum working efficiency. The first input condition of the lower-layer optimization is that an instruction of completion of the upper-layer optimization is received, and a condition of an internal stack is optimized after input and output capabilities of the PCIe switch have reached a balance at this moment. After receiving the instruction of completion, the PCIe switch first counts working conditions of the input and output channels in each stack section at this moment, and transmits quantified working conditions to the large-scale system carried by the CPU as input parameters for optimization. For example, if STACK1 includes a total of n channels, m channels are used for inputting data and j channels are used for outputting data at this moment, and k channels are idle at this moment. According to the conditions of the channels in each stack in the input parameters, the CPU unit first calculates the total quantity of input/output channels currently participating in the work, and respectively calculates the average values of the current input/output channels according to the quantity of stacks to obtain a preliminary channel adjustment result. Each stack is adjusted according to the preliminary channel adjustment result. Considering an actual working condition of each stack section at this moment, a channel adjustment result of each stack is given. Each stack in this time period is sorted according to a k value of the idle channel, and on the basis of the preliminary adjustment result, 1 or 2 channels are less allocated to the stack with more idle channels, and 1 or 2 channels are more allocated to the stack with fewer idle channels, thereby finally maintaining dynamic balance. Storage space is re-allocated from an SSD array, according to the given channel adjustment result, conditions of the adjusted input/output channels are mapped into the newly allocated storage space in the SSD, and data in the storage space is integrated into the total storage space at the end of this time period.

Considering the internal stack structure of the PCIe switch chip and the working characteristics of the cascade structure that the front end reads data and the back end writes data, this embodiment proposes a dual-layer optimized data transmission dynamic planning method. The algorithm takes the running time as the scale. In the first layer optimization, quantities of input and output channels used for data transmission at a current moment are adjusted. The quantities of input and output channels are adjusted according to a data transmission condition at the current moment, to ensure that the quantities of input and output channels are as equal as possible after adjustment. In this way, the maximum switch transmission rate can be ensured. On the basis of the first layer optimization, in the second layer optimization, conditions of transmission channels in each stack in the PCIe switch are adjusted, to ensure the balance of the working capabilities of the stacks. In this way, the data transmission rate of the PCIe switch is further improved. Such hardware and software algorithm-based storage path planning and adjustment ensures that the PCIe switch can work in an optimal data transmission state in each time period, thereby improving the storage efficiency.

In the following, an apparatus for allocating a channel provided in the embodiments of the present application is described. The apparatus for allocating a channel described below and the method for allocating a channel described above may be referred to each other.

Figure 8:
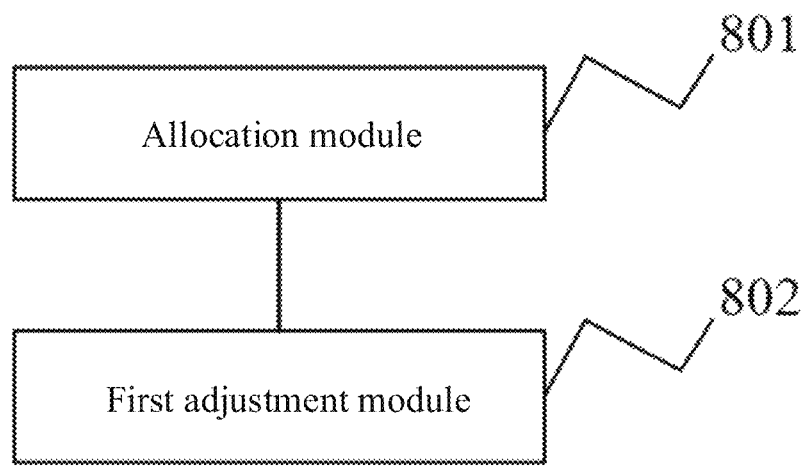
FIG. 8 is a structural diagram of an apparatus for allocating a channel according to an exemplary embodiment.

FIG. 8 is a structural diagram of an apparatus for allocating a channel according to an exemplary embodiment. As shown in FIG. 8, the apparatus includes:

an allocation module 801, configured to determine a target data segment to be transmitted in a current time period, and allocate a transmission channel to the target data segment, the transmission channel including an input channel and an output channel, the input channel including a first input channel for inputting from a switch and a second input channel for inputting from a processor, and the output channel including a first output channel for outputting to a storage device and a second output channel for outputting to the processor; and a first adjustment module 802, configured to acquire a quantity of input channels and a quantity of output channels in the current time period, and adjust the input channel and the output channel based on the quantity of input channels and the quantity of output channels, to make the quantity of input channels equal to the quantity of output channels.

According to the apparatus for allocating a channel provided in the embodiments of the present application, the quantities of input and output channels are adjusted according to a data transmission condition in the current time period, to ensure that the quantities of input and output channels are as equal as possible after adjustment. In this way, the maximum switch transmission rate can be ensured. It can be seen from the above that in the embodiments of the present application, by adjusting the transmission channel of the switching device, it is ensured that the switching device can work in an optimal data transmission state in each time period, thereby improving the storage efficiency.

On the basis of the foregoing embodiments, as a preferred implementation, the apparatus further includes:

a partitioning module, configured to partition data to be transmitted into a plurality of data segment, each data segment corresponding to one time period.

On the basis of the foregoing embodiments, as a preferred implementation, the apparatus further includes:

a marking module, configured to mark a start bit and an end bit of each data segment.

On the basis of the foregoing embodiments, as a preferred implementation, the allocation module 801 is specifically configured to: determine the target data segment to be transmitted in the current time period; and when the start bit of the target data segment is detected, allocate the transmission channel to the target data segment.

On the basis of the foregoing embodiments, as a preferred implementation, the first adjustment module 802 includes:

a first adjustment unit, configured to when the quantity of input channels is less than the quantity of output channels, adjust the input channel and the output channel according to a data processing state of the processor.

On the basis of the foregoing embodiments, as a preferred implementation, the first adjustment unit is specifically configured to: if the processor is in a busy state, reduce the quantity of second output channels; and if the processor is in an idle state, increase the quantity of second output channels.

On the basis of the foregoing embodiments, as a preferred implementation, the first adjustment unit is specifically configured to: if the processor is in the busy state, reduce the quantity of second output channels; and if the processor is in the idle state, increase the quantity of second output channels and increase the quantity of first input channels.

On the basis of the foregoing embodiments, as a preferred implementation, the first adjustment module 802 includes:

a second adjustment unit, configured to when the quantity of input channels is greater than the quantity of output channels, increase the quantity of first output channels.

On the basis of the foregoing embodiments, as a preferred implementation, the second adjustment unit is specifically configured to: when the quantity of input channels is greater than the quantity of output channels, increase the quantity of first output channels; create a first independent region in the remaining storage resources of the storage device, and map the added first output channel into the first independent region; and after the target data segment corresponding to the current time period is transmitted, integrate data in the first independent region into total storage resources.

On the basis of the foregoing embodiments, as a preferred implementation, the apparatus further includes:

a second adjustment module, configured to adjust a transmission channel in each stack section in the switching device, to balance the transmission data volume of each stack section.

On the basis of the foregoing embodiments, as a preferred implementation, the second adjustment module includes:

a third adjustment unit, configured to calculate an average value of input channels and an average value of output channels in each stack section in the switching device; adjust the input channels in each stack section based on the average value of the input channels, and adjust the output channels in each stack section based on the average value of the output channels.

On the basis of the foregoing embodiments, as a preferred implementation, the second adjustment module includes:

a fourth adjustment unit, configured to acquire a quantity of idle channels in each stack section in the switching device; if the quantity of idle channels is greater than a pre-set value, reduce a transmission channel in a corresponding stack section; and if the quantity of idle channels is less than the pre-set value, add a transmission channel in a corresponding stack section.

On the basis of the foregoing embodiments, as a preferred implementation, the second adjustment module is specifically configured to: adjust the transmission channel in each stack section in the switching device, to balance the transmission data volume of each stack section; create a second independent region in the remaining storage resources of the storage device, and map the adjusted transmission channel in each stack section into the second independent region; and after the target data segment corresponding to the current time period is transmitted, integrate data in the second independent region into the total storage resource.

For the apparatus provided in the foregoing embodiments, the specific manner in which the various modules perform the operations has been described in detail in the embodiments of the method, and will not be described in detail herein.

Figure 9:
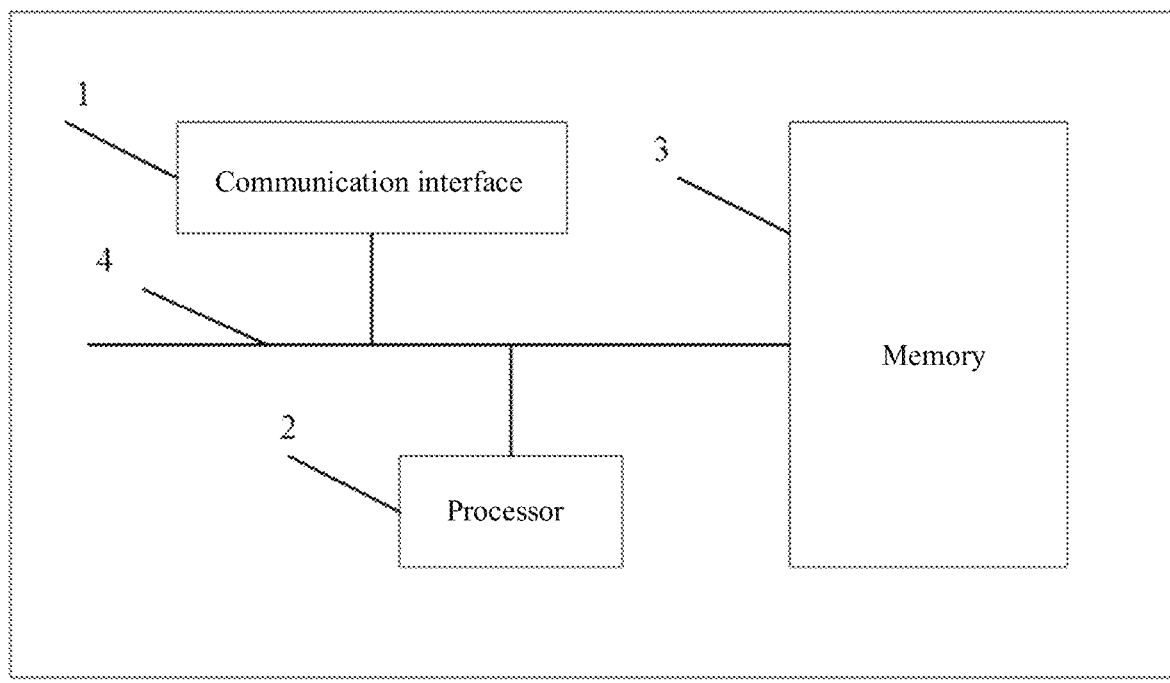
FIG. 9 is a structural diagram of an electronic device according to an exemplary embodiment.

Based on the hardware implementation of the foregoing program modules, and in order to implement the method provided in the embodiments of the present application, the embodiments of the present application further provide an electronic device. FIG. 9 is a structural diagram of an electronic device according to an exemplary embodiment. As shown in FIG. 9, the electronic device includes:

a communication interface 1, capable of performing information interaction with another device such as a network device; and a processor 2, which is connected to the communication interface 1 to realize information interaction with another device, and is configured to execute a computer program to implement the method for allocating a channel provided in one or more of the foregoing technical solutions, the computer program being stored in the memory 3.

Of course, in practice, the components of the electronic device are coupled together via a bus system 4. It may be understood that the bus system 4 is configured to implement the connection communication between these components. In addition to a data bus, the bus system 4 includes a power bus, a control bus, and a state signal bus. However, for clear description, various buses in FIG. 9 are marked as the bus system 4.

The memory 3 in the embodiments of the present application is configured to store various types of data to support the operation of the electronic device. Examples of such data include: any computer program for operating on the electronic device.

It may be understood that the memory 3 may be a transitory memory or non-transitory memory, and may include both a volatile memory and a non-transitory memory. The non-transitory memory may be a read-only memory (ROM), a programmable ROM (PROM), an erasable PROM (EPROM), an electrically EPROM (EEPROM), a ferromagnetic random-access memory (FRAM), a flash memory, a magnetic surface memory, an optical disk, or a compact disc ROM (CD-ROM). The magnetic surface memory may be a disk storage or a tape storage. The volatile memory may be an RAM, which acts as an external cache. By way of illustration and not limitation, many forms of RAMs are available, such as a static RAM (SRAM), a synchronous SRAM (SSRAM), a dynamic RAM (DRAM), a synchronous DRAM (SDRAM), a double data rate SDRAM (DDRSDRAM), an enhanced SDRAM (ESDRAM), a SynchLink DRAM (SLDRAM), and a Direct Rambus RAM (DRRAM). The memory 3 described in the embodiments of the present application is intended to include, but is limited to, these memories and any other suitable types of memories.

The method disclosed in the foregoing embodiments of the present application is applicable to or implemented by the processor 2. The processor 2 may be an integrated circuit chip having signal processing capabilities. In an implementation process, the steps of the foregoing method may be implemented by an integrated logic circuit of hardware in the processor 2 or an instruction in a software form. The foregoing processor 2 may be a general-purpose processor, a digital signal processor (DSP) or another programmable logic device, a discrete gate or transistor logic device, a discrete hardware component, or the like. The processor 2 may implement or perform the methods, steps, and logic blocks disclosed in the embodiments of the present application. The general-purpose processor may be a microprocessor or any conventional processor. The steps of the method disclosed in the embodiments of the present application may be implemented directly by a hardware decoding processor, or by a combination of hardware and software modules in a decoding processor. The software module may be located in a storage medium, which is located in the memory 3. The processor 2 reads the program in the memory 3 and, in combination with its hardware, performs the steps of the foregoing method.

The processor 2 executes the program to implement the corresponding flows in the various methods provided in the embodiments of the present application, which, for the sake of brevity, will not be described in detail herein.

In an exemplary embodiment, the embodiments of the present application further provide a storage medium, namely, a computer storage medium. Specifically, the storage medium is a non-transitory readable storage medium, such as a memory 3 storing a computer program. A processor 2 executes the forgoing computer program to implement the steps of the foregoing method. The non-transitory readable storage medium may be a memory such as an FRAM, an ROM, a PROM, an EPROM, an EEPROM, a flash Memory, a magnetic surface storage, an optical disc, a CD-ROM, or the like.

Those skilled in the art may understand that the steps of the method embodiments described above, in whole or in part, can be implemented through hardware related to program instructions. The aforementioned program can be stored in a computer-readable storage medium. When executed, the program performs the steps of the method embodiments described above. The aforementioned storage medium includes various media that can store program code, such as mobile storage devices, ROM, RAM, magnetic disks, or optical discs.

Alternatively, if the integrated units of the present application are implemented in the form of software functional modules and sold or used as independent products, they can also be stored in a computer-readable storage medium. Based on this understanding, the technical solutions of the embodiments of the present application, essentially or the parts that make contributions to the existing technology, can be embodied in the form of a software product. This computer software product is stored in a storage medium and includes several instructions to enable an electronic device (which can be a personal computer, server, network device, etc.) to perform all or part of the methods of the various embodiments of the present application. The aforementioned storage medium includes various media that can store program code, such as mobile storage devices, ROM, RAM, magnetic disks, or optical discs.

The above are merely specific implementations of the present application. However, the scope of protection of the present application is not limited to this. Any changes or substitutions that can be easily conceived by those skilled in the art within the technical scope disclosed by the present application should be covered within the scope of protection of the present application. Therefore, the scope of protection of the present application should be determined by the scope of the claims.

The invention claimed is:

1. A method for allocating a channel, applied to a switching device and comprising:
   determining, by the switching device, a target data segment to be transmitted in a current time period, and allocating a transmission channel to the target data segment, the transmission channel comprising a plurality of input channels and a plurality of output channels, the plurality of input channels comprising a plurality of first input channels and a plurality of second input channels, the first input channels are the input channels for inputting from a switch to the switching device, the second input channels are the input channels for inputting from a processor to the switching device; and the plurality of output channels comprising a plurality of a first output channels and a plurality of second output channels, the first output channels are the output channels for outputting from the switching device to a storage device, the second output channels are the output channels for outputting from the switching device to the processor; and
   acquiring, by the switching device, a quantity of input channels and a quantity of output channels in the current time period, and adjusting, by the processor, the input channels and the output channels based on the quantity of input channels and the quantity of output channels, to make the quantity of input channels equal to the quantity of output channels.

2. The method for allocating a channel according to claim 1, wherein before the determining a target data segment to be transmitted in a current time period, the method further comprises:
   partitioning data to be transmitted into a plurality of data segment, each data segment corresponding to one time period.

3. The method for allocating a channel according to claim 2, wherein after the partitioning data to be transmitted into a plurality of data segments, the method further comprises:
   marking a start bit and an end bit of each data segment.

4. The method for allocating a channel according to claim 3, wherein the determining a target data segment to be transmitted in a current time period, and allocating a transmission channel to the target data segment comprises:
   determining the target data segment to be transmitted in the current time period; and
   when the start bit of the target data segment is detected, allocating the transmission channel to the target data segment.

5. The method for allocating a channel according to claim 1, wherein the adjusting, by the processor, the input channels and the output channels based on the quantity of input channels and the quantity of output channels comprises:
   if the quantity of input channels is less than the quantity of output channels, adjusting the input channels and the output channels according to a data processing state of the processor.

6. The method for allocating a channel according to claim 5, wherein the adjusting, by the processor, the input channels and the output channels according to a data processing state of the processor comprises:
   if the processor is in a busy state, reducing the quantity of second output channels.

7. The method for allocating a channel according to claim 5, wherein the adjusting, by the processor, the input channels and the output channels according to a data processing state of the processor comprises:
   if the processor is in an idle state, increasing the quantity of second output channels.

8. The method for allocating a channel according to claim 7, wherein after the increasing the quantity of second output channels, the method further comprises:
   increasing the quantity of first input channels.

9. The method for allocating a channel according to claim 1, wherein the adjusting, by the processor, the input channels and the output channels based on the quantity of input channels and the quantity of output channels comprises:
   if the quantity of input channels is greater than the quantity of output channels, increasing the quantity of first output channels.

10. The method for allocating a channel according to claim 9, wherein after the increasing the quantity of first output channels, the method further comprises:
    creating a first independent region in the remaining storage resources of the storage device, and mapping the added first output channel into the first independent region; and
    after the target data segment corresponding to the current time period is transmitted, integrating data in the first independent region into total storage resources.

11. The method for allocating a channel according to claim 1, wherein after the adjusting, by the processor, the input channels and the output channels based on the quantity of input channels and the quantity of output channels, the method further comprises:
    adjusting a transmission channel in each stack section in the switching device, to balance the transmission data volume of each stack section;
    wherein the adjusting a transmission channel in each stack section in the switching device comprises:
    calculating an average value of input channels and an average value of output channels in each stack section in the switching device; and
    adjusting the input channels in each stack section based on the average value of the input channels, and adjusting the output channels in each stack section based on the average value of the output channels.

12. The method for allocating a channel according to claim 11, wherein after the adjusting a transmission channel in each stack section in the switching device, the method further comprises:
    creating a second independent region in the remaining storage resources of the storage device, and mapping the adjusted transmission channel in each stack section into the second independent region; and
    after the target data segment corresponding to the current time period is transmitted, integrating data in the second independent region into the total storage resources.

13. The method for allocating a channel according to claim 1, wherein after the adjusting, by the processor, the input channels and the output channels based on the quantity of input channels and the quantity of output channels, the method further comprises:
    adjusting a transmission channel in each stack section in the switching device, to balance the transmission data volume of each stack section;
    wherein the adjusting a transmission channel in each stack section in the switching device comprises:
    acquiring a quantity of idle channels in each stack section in the switching device;
    if the quantity of idle channels is greater than a pre-set value, reducing a transmission channel in a corresponding stack section; and if the quantity of idle channels is less than the pre-set value, adding a transmission channel in a corresponding stack section.

14. An electronic device for allocating a channel, comprising:
a memory, configured to store a computer program; and
a processor, configured to execute the computer program to:
determine a target data segment to be transmitted in a current time period, and allocate a transmission channel to the target data segment, the transmission channel comprising a plurality of input channels and a plurality of output channels, the plurality of input channels comprising a plurality of first input channels and a plurality of second input channels, the first input channels are the input channels for inputting from a switch to the switching device, the second input channels are the input channels for inputting from a processor to the switching device; and the plurality of output channels comprising a plurality of first output channels and a plurality of second output channels, the first output channels are the output channels for outputting from the switching device to a storage device, the second output channels are the output channels for outputting from the switching device to the processor; and
acquire a quantity of input channels and a quantity of output channels in the current time period, and adjust the input channels and the output channels based on the quantity of input channels and the quantity of output channels, to make the quantity of input channels equal to the quantity of output channels.

15. A storage system, comprising a server, a switch, a switching device, a processor, and a storage device, wherein the server is connected to a first target stack section of the switching device via the switch, input channels of the first target stack section are all connected to the switch, one part of output channels of the first target stack section are connected to the switch, and the other part of the output channels of the first target stack section are connected to the storage device;

the storage device is connected to a second target stack section of the switching device, output channels of the second target stack section are all connected to the storage device, one part of input channels of the second target stack section are connected to the storage device, and the other part of the input channels of the second target stack section are connected to the switch;
the server is configured to transmit data to the switching device via the switch;
the switching device is configured to transmit the data to the processor;
the processor is configured to process the data, and return the processed data to the switching device;
the switching device is further configured to transmit the processed data to the storage device for storage;
the processor is further configured to determine a target data segment to be transmitted in a current time period, allocate an input channel and an output channel to the target data segment, and adjust the input channel and the output channel based on a quantity of input channels and a quantity of output channels in the current time period, to make the quantity of input channels equal to the quantity of output channels; and
the switching device is a PCIE SWITCH, the processor is a CPU, and the storage device is an SSD with type of NVME, the PCIE SWITCH is connected to the switch via optical fibre transmission of a Fibre Channel host bus adapter, data processed at the server is transmitted to the SSD with type of NVME via the switch; the PCIE SWITCH is connected to the CPU via the transmission channel of the PCIE SWITCH; the PCIE SWITCH is connected to the SSD with type of NVME via the transmission channel of the PCIE SWITCH.

16. The storage system according to claim 15, wherein the total quantity of input channels and the total quantity of output channels in each stack section in the switching device are equal.

17. The storage system according to claim 15, wherein a quantity of input channels and a quantity of output channels of the processor are equal.

* * * * *